United States Patent [19]

Fujioka

[11] Patent Number: 5,296,977
[45] Date of Patent: Mar. 22, 1994

[54] DIGITAL RECORDING/REPRODUCING METHOD IN WHICH DIGITAL CONTROL CODES ARE SIMULTANEOUSLY RECORDED/REPRODUCED WITH ANALOG INFO TO ENHANCE ANALOG RECORDING/REPRODUCTION

[75] Inventor: Nagaki Fujioka, Saitama, Japan

[73] Assignee: Pioneer Electronic Corporation, Tokyo, Japan

[21] Appl. No.: 874,856

[22] Filed: Apr. 28, 1992

[30] Foreign Application Priority Data

Sep. 30, 1991 [JP] Japan .................. 3-252079

[51] Int. Cl.$^5$ .................. G11B 15/12; G11B 5/02
[52] U.S. Cl. .................. 360/63; 360/27; 360/61
[58] Field of Search .................. 360/22, 27, 28, 39, 360/40, 48, 51, 55, 61, 63, 73.1 2, 72.2, 61–63, 32, 77.12

[56] References Cited

U.S. PATENT DOCUMENTS

| 4,121,264 | 10/1978 | Kishi et al. |
| 4,583,134 | 4/1986 | Nakamichi .................. 360/69 |

FOREIGN PATENT DOCUMENTS

| 0142626 | 5/1985 | European Pat. Off. |
| 0381266 | 8/1990 | European Pat. Off. |
| 0430613 | 5/1991 | European Pat. Off. |
| 430265 | 6/1991 | European Pat. Off. |
| 0430265 | 6/1991 | European Pat. Off. |
| 430613 | 6/1991 | European Pat. Off. |
| 9002402 | 3/1990 | PCT Int'l Appl. .................. 360/32 |
| 2082365 | 3/1982 | United Kingdom. |
| 2109144 | 5/1983 | United Kingdom. |

OTHER PUBLICATIONS

IBM Technical disclosure Bulletin vol. 15, No. 6, Nov. 1992.

Primary Examiner—Robert J. Pascal
Assistant Examiner—Arnold Kinkead
Attorney, Agent, or Firm—Sughrue, Mion, Zinn, Macpeak & Seas

[57] ABSTRACT

A digital recording and reproducing method and system by which a desired control code can be recorded onto and reproduced from an analog record tape to improve the operability in reproduction of such analog record tape. A fixed head unit is used which has a first track face on which an analog head is provided and a second track face on which a plurality of digital heads are provided. Upon analog reproduction or recording onto or from one of a pair of analog tracks of a tape by means of the analog head, a desired control code is digitally recorded onto a non-recorded gap portion of the other analog track using a particular one of the digital heads. Then, upon analog reproduction by the analog head, the digitally recorded control code is read out from the tape using the digital heads.

10 Claims, 5 Drawing Sheets

F I G. 5
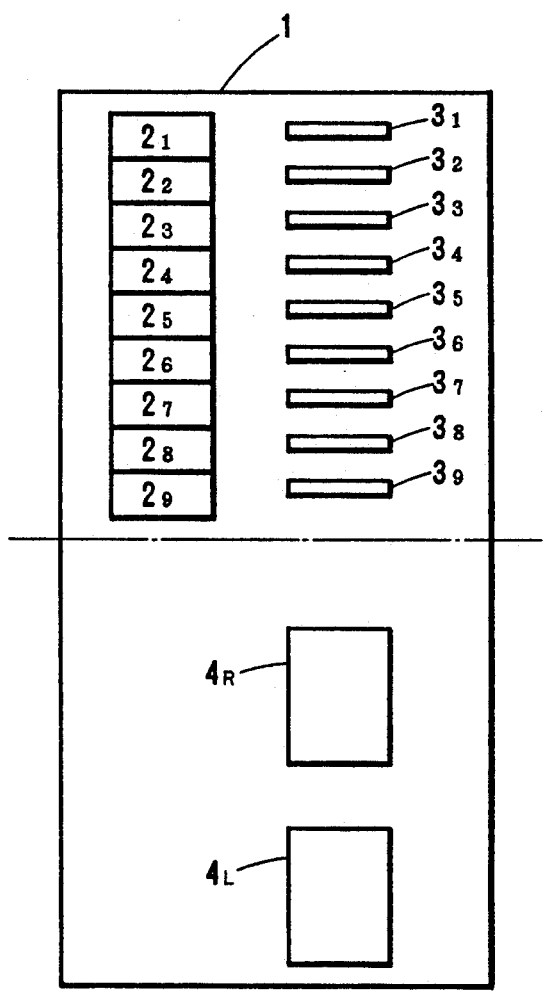

DIGITAL RECORDING/REPRODUCING METHOD IN WHICH DIGITAL CONTROL CODES ARE SIMULTANEOUSLY RECORDED/REPRODUCED WITH ANALOG INFO TO ENHANCE ANALOG RECORDING/REPRODUCTION

BACKGROUND OF THE INVENTION

1. Field of the Invention

This invention relates to a recording and reproducing method of a digital tape recorder of the fixed head type for digitally recording and reproducing a desired control code onto and from an analog record tape.

2. Description of the Prior Art

Digital tape recorders of the fixed head type have been proposed recently which can record digitally while maintaining the compatibility with a compact cassette of the analog recording type.

An exemplary one of fixed head units employed in digital tape recorders of the fixed head type mentioned is shown in FIG. 5. Referring to FIG. 5, the fixed head unit generally denoted at 1 has a magnet head face which is divided into two track faces. Up to nine digital recording heads $2_1$ to $2_9$ and digital reproducing heads $3_1$ to $3_9$ of the 9-channel construction are provided in line, i.e., in two columns in a direction perpendicular to a tape feeding direction (horizontal direction in FIG. 5) on an upper side one of the two track faces of the fixed head unit 1 in FIG. 5.

Meanwhile, the other track face on the lower side in FIG. 5 of the fixed head unit 1 has a pair of analog reproducing heads $4_L$ and $4_R$ provided thereon for reproducing a conventional compact cassette of the analog recording type. The fixed head unit 1 is connected to be rotated or turned over by 180 degrees around a horizontal axis perpendicular to the plane of FIG. 5 by a changing over mechanism not shown so that a tape not shown may be reproduced whether the tape is fed in one direction or the other direction.

With such digital tape recorder of the fixed head type, upon digital recording, various sub codes can be digitally recorded together with music or the like, and a very high operability is obtained similarly to a compact disk (CD) player or a digital audio tape player (DAT) by making use of such sub codes. However, as regards an analog record tape, the digital tape recorder of the fixed head type is equivalent to a conventional cassette deck, and it is hard to say that its operability is satisfactory comparing with a digital record tape.

SUMMARY OF THE INVENTION

It is an object of the present invention to provide a digital recording and reproducing method which improves the operability in reproduction of an analog record tape by a digital tape recorder of the fixed head type.

It is another object of the present invention to provide a digital recording and reproducing system which is improved in operability upon reproduction of an analog record tape.

It is a further object of the present invention to provide a digital recording and reproducing method and system by which a desired control code can be recorded onto and reproduced from an analog record tape.

In order to attain the objects, according to an aspect of the present invention, there is provided a digital recording and reproducing method for a digital tape recorder of the fixed head type wherein a fixed head unit has a first track face on which an analog head is provided and a second track face on which a plurality of digital heads are provided, which comprises the steps of digitally recording, upon analog reproduction or recording onto or from one of a pair of analog tracks of a tape by means of the analog head, a desired control code onto a non-recorded gap portion of the other analog track using a particular one of the digital heads, and reading out, upon analog reproduction by the analog head, the digitally recorded control code from the tape using the digital heads.

According to another aspect of the present invention, there is provided a digital recording and reproducing system, which comprises a fixed head unit having a first track face on which an analog head is provided and a second track face on which a plurality of digital heads are provided, digital signal supplying means for supplying digital signals to be recorded to the digital heads, digital signal processing means for processing digital signals read by the digital heads, control code generating means for generating a control code, first change-over switch means interposed between a particular one of the digital heads and the digital signal supplying means, second change-over switch means interposed between the particular digital head and the digital signal processing means, control code decoding means for decoding a control code, and controlling means for controlling the first change-over switch means, upon analog reproduction or recording from or onto one of a pair of analog tracks of a tape by means of the analog head, to transmit a control code from the control code generating means to the particular digital head so as to be recorded onto a non-recorded gap portion of the other analog track and for controlling the second change-over switch means, upon analog reproduction by the analog head, to transmit a control code from the particular digital head to the control code decoding means.

With the digital recording and reproducing method and apparatus, various information can be digitally recorded onto an analog record tape upon analog reproduction or recording by means of the analog head and then utilized upon analog reproduction by the analog head. Consequently, the operability of such analog record tape upon reproduction is improved significantly.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 5 is a diagrammatic illustrative view showing a magnetic head face of a fixed head unit which can be applied in the present invention.

DESCRIPTION OF THE PREFERRED EMBODIMENT

Figure 1:
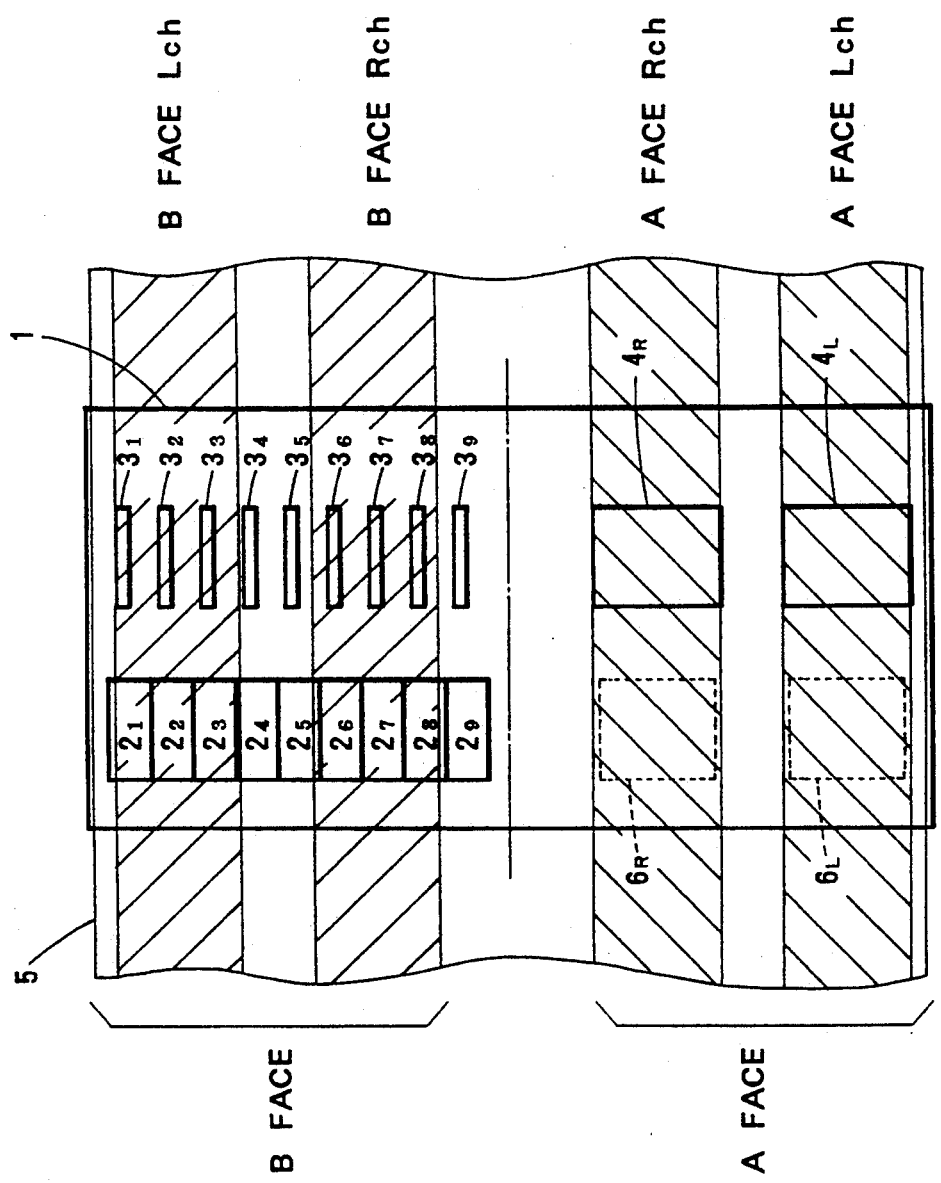
FIG. 1 is a diagrammatic illustrative view showing a positional relationship between a fixed head unit and an analog record tape and illustrating a principle of a recording and reproducing method according to the present invention.

Referring first to FIG. 1, there is shown a positional relationship between a fixed head unit and an analog record tape. The fixed head unit is generally denoted as 1 and has a substantially similar construction to that of the fixed head unit shown in FIG. 5. In particular, the fixed head unit 1 has a magnet head face which is divided into two track faces, which correspond to two analog track A and B faces of an analog record tape 5. Up to nine digital recording heads $2_1$ to $2_9$ and digital reproducing heads $3_1$ to $3_9$ of the 9-channel construction are provided in line or in two columns in a direction perpendicular to a tape feeding direction (horizontal direction in FIG. 1) on an upper side one of the two track faces of the fixed head unit 1 in FIG. 1.

Meanwhile, the other track face on the lower side in FIG. 1 of the fixed head unit 1 has a pair of analog reproducing heads $4_L$ and $4_R$ provided thereon for reproducing a conventional compact cassette of the analog recording type. The fixed head unit 1 is connected to be rotated or turned over by 180 degrees around a horizontal axis perpendicular to the plane of FIG. 1 by a changing over mechanism not shown so that an analog record tape 5 may be reproduced whether it is fed in one direction or the other direction, i.e., horizontally leftwardly or rightwardly in FIG. 1.

In the positional relationship between the heads $2_1$ to $2_9$, $3_1$ to $3_9$, $4_L$ and $4_R$ on the fixed head unit 1 and the analog track A and B faces on the analog record tape 5 illustrated in FIG. 1, the digital recording head $2_9$ and the digital reproducing head $3_9$ positioned at the innermost head positions in the head columns adjacent the center of the analog record tape 5 are positioned on the inner side with respect to an R channel of the analog track B face of the analog record tape 5. Thus, when the fixed head unit 1 is turned over by 180 degrees around its horizontal axis, the digital recording head $2_9$ and the digital reproducing head $3_9$ will be positioned at the innermost head positions adjacent the center of the analog record tape 5 inwardly of an R channel of the analog track A face of the analog record tape 5 similarly to those before the fixed head unit 1 is turned by 180 degrees.

Consequently, even if digital data are recorded onto the analog record tape 5 using the digital recording head $2_9$, the digital data will not overlap with any of the analog tracks on the analog record tape 5. Accordingly, digital data can be recorded onto part of the analog record tape 5 without having any influence upon an analog record signal on the analog record tape 5. Thus, according to the present invention, a desired control code such as, for example, a tune head identifier (ID) code, an end ID code, a head turning over ID code or a tune title data code is digitally recorded onto an analog record tape by making use of such relationship between digital heads and analog tracks as described just above.

In particular, in the arrangement of the fixed head unit 1 shown in FIG. 1, while analog record signals on the analog track A face are being reproduced by the analog reproducing heads $4_L$ and $4_R$, a desired control code is digitally recorded onto a non-recorded gap portion adjacent the innermost end of the analog track B face opposite to the A face using the digital recording head $2_9$. Consequently, a control code similar to a sub code of the case of digital recording can be digitally recorded onto the analog record tape 5 without having any influence on an analog record signal on the analog record tape 5.

It is to be noted that, when the analog reproducing heads $4_L$ and $4_R$ are recording and reproducing heads, or when independent analog recording heads $6_L$ and $6_R$ are provided as indicated by broken lines in FIG. 1, a control code can be digitally recorded simultaneously not only upon analog reproduction but also upon analog recording.

On the other hand, in a reproducing operation of a control code, while analog record signals recorded on the A face of the analog record tape 5 are being read out by the analog reproducing heads $4_L$ and $4_R$ and reproduced, a control code digitally recorded on the analog record tape 5 in accordance with the recording method of the present invention is read out from a nonrecorded gap portion adjacent the innermost end of the B face on the opposite side of the analog record tape 5 by means of the digital reproducing head $3_9$.

Consequently, necessary information regarding a tune recorded in the form of an analog signal on the analog record tape 5 can be obtained from the control code together with an analog reproduction signal. Accordingly, the operability upon reproduction of an analog record tape is improved making use of such information.

Figure 2:
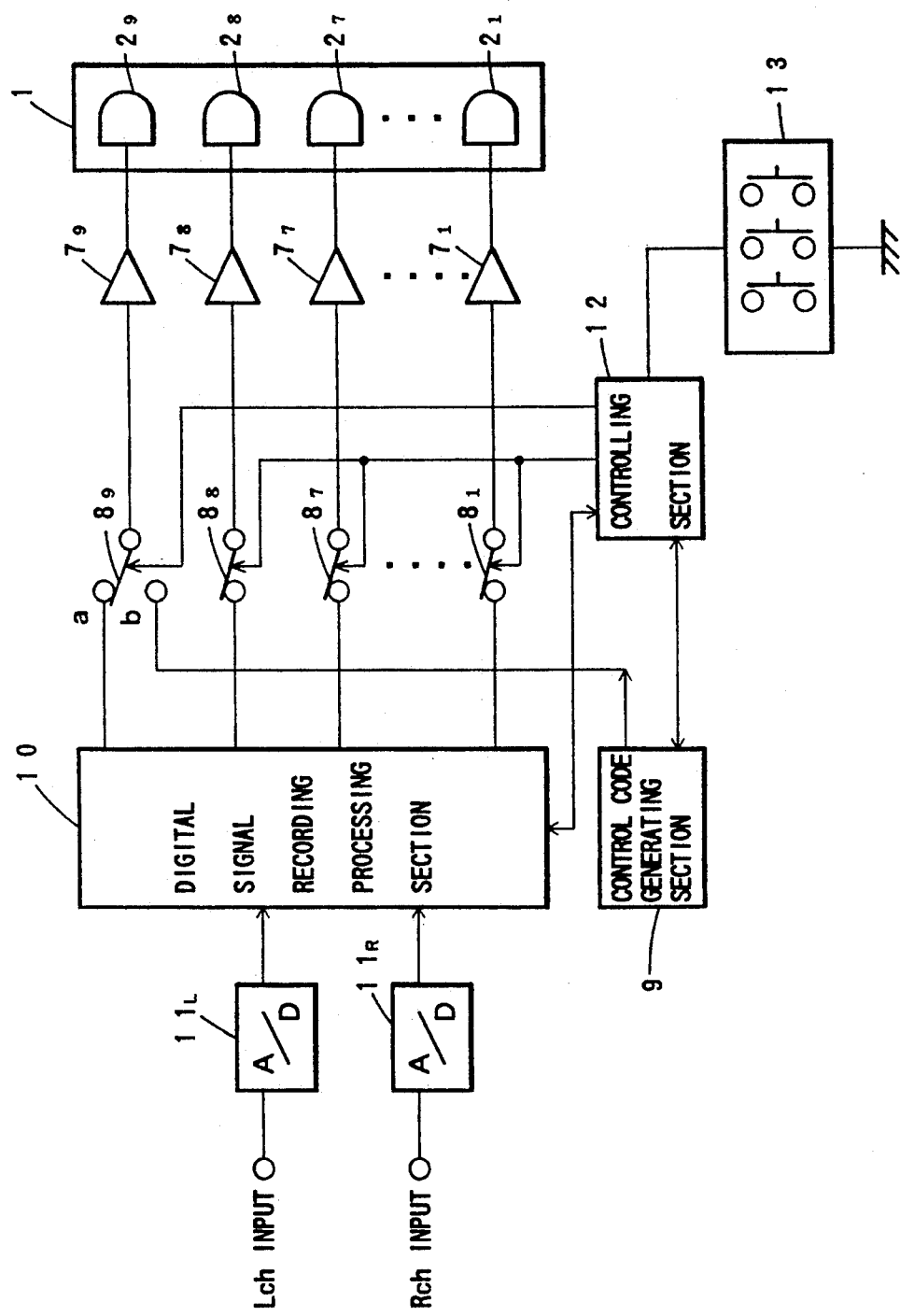
FIG. 2 is a block diagram of a recording system of a digital tape recorder of the fixed head type to which the present invention is applied.
Figure 3:
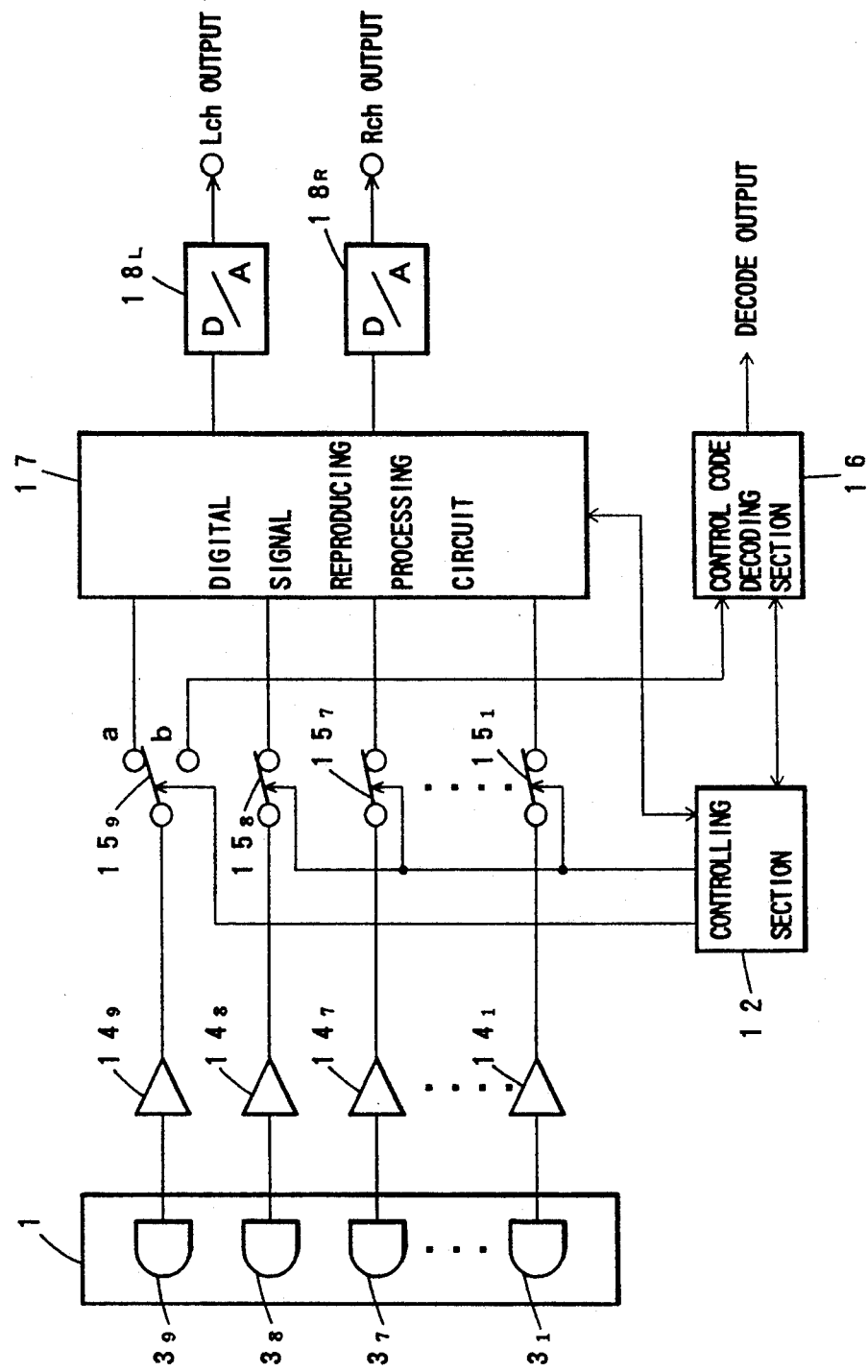
FIG. 3 is a block diagram of a reproducing system of the digital tape recorder.

A digital tape recorder of the fixed head type to which the present invention is applied is shown in FIGS. 2 and 3. In particular, FIG. 2 shows a recording system while FIG. 3 shows a reproducing system of the digital tape recorder of the fixed head type. It is to be noted that only those elements which directly relate to recording and reproduction of a control code are shown in FIGS. 2 and 3, respectively.

Referring first to FIG. 2, the digital tape recorder includes a fixed head unit 1 having such construction as described hereinabove with reference to FIG. 1. Thus, the fixed head unit 1 has up to nine digital recording heads $2_1$ to $2_9$ as described above. The recording system of the digital tape recorder thus includes nine recording head amplifiers $7_1$ to $7_9$ connected to the digital recording heads $2_1$ to $2_9$, respectively, and nine switches $8_1$ to $8_9$ connected the recording head amplifiers $7_1$ to $7_9$, respectively. The switches $8_1$ to $8_9$ are constituted from on/off switches while the remaining switch $8_9$ which corresponds to the digital recording head $2_9$ for use for recording of a control code is constituted from a change-over switch. The switch $8_9$ has two terminals a and b and is changed over from the terminal a to the terminal b when the digital tape recorder of the fixed head type is in a control code recording mode in which a control code is recorded.

The recording system further includes a control code generating section 9 for generating a desired control code to be digitally recorded onto an analog record tape such as, for example, a tune head ID code, an end ID code, a head turning over ID code, a tune title data code or the like.

The recording system further includes a digital signal recording processing section 10. The digital signal recording processing section 10 processes left and right channel (Lch and Rch) signals for digital recording received by way of analog to digital (A/D) converters $11_L$ and $11_R$ in accordance with a predetermined algorithm, and adds necessary data such as a sub code to the left and right channel signals and then converts them into digital data of the 9-bit construction. The digital data are outputted to the switches $8_1$ to $8_9$. Upon normal digital recording, such digital data of the 9-bit construction are transmitted to the digital recording heads $2_1$ to $2_9$ by way of the switches $8_1$ to $8_9$ and the recording head amplifiers $7_1$ to $7_9$, respectively, so that they are recorded in a parallel in-line format onto a digital record tape by means of the digital recording heads $2_1$ to $2_9$.

The digital tape recorder includes a controlling section 12 for controlling operation of the entire system including the recording system described above and the reproducing system which will be hereinafter described, and a code writing instruction switch unit 13 for inputting a writing instruction of a desired control code.

Figure 4:
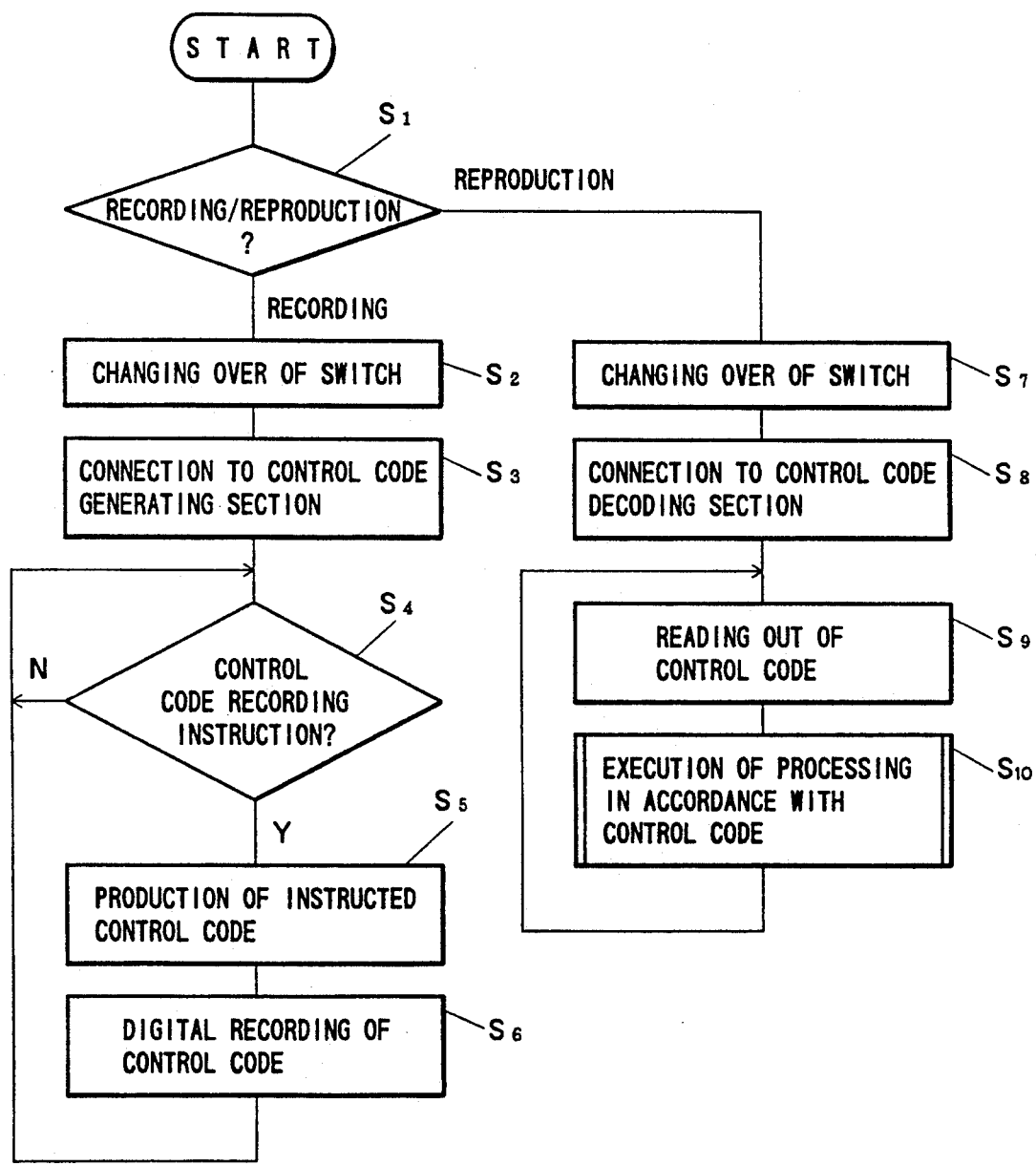
FIG. 4 is a flow chart illustrating operation of the digital tape recorder.

FIG. 4 illustrates operation of the digital tape recorder of the fixed head type when a tune head ID code is digitally recorded, during reproduction of a recorded tune on an analog record tape by means of the analog reproduction heads $4_L$ and $4_R$ (refer to FIG. 1), as a control code at the position of the head of the tune.

Referring to FIG. 4, after processing is started, the controlling section 12 judges, first at step $S_1$, whether the digital tape recorder is in a recording mode or a reproduction mode. In this instance, since the digital tape recorder is in a control code recording mode in which a control code is to be recorded, the control sequence advances to step $S_2$.

At step $S_2$, the controlling section 12 changes over the switches $8_1$ to $8_8$ other than the switch $8_9$ into an off state and changes over the switch $8_9$ from the terminal a to the terminal b to connect the control code recording digital recording head $2_9$ to the control code generating section 9. Then, the controlling section 12 puts the control code generating section 9 into an operative condition at step $S_3$.

While the music reproduced from the analog record tape is being enjoyed, when the position of the head of a desired tune is reached, a tune head ID switch of the code writing instructing switch unit 13 will be depressed by the operator at step $S_4$. The controlling section 12 instructs, when it receives such tune head ID code writing instruction from the tune head ID switch. the control code generating circuit 9 of production of a tune head ID code.

The control code generating circuit 9 produces a thus instructed tune head ID code at step $S_5$ and sends the thus produced tune head ID code to the digital recording head $2_9$ by way of the switch $8_9$ at step $S_6$ so that the tune head ID code is digitally recorded by means of the digital recording head $2_9$ to the innermost end position of an analog track of the analog record tape 5 from which the music is being reproduced. Consequently, a tune head ID code similar to that of the case of digital recording is recorded onto the analog record tape.

It is to be noted that, if the processing described above is performed in an interlocking relationship with automatic detection of a tune head based on detection of a level of an analog reproduction signal, then the tune head ID code can be recorded automatically. Further, while the digital recording head $2_9$ at the innermost end is used as a head for recording a control code, which one of the digital recording heads should be used naturally depends upon a relationship between a tape format of digital recording and another tape format of analog recording.

Referring now to FIG. 3, the reproducing system of the digital tape recorder includes up to nine reproducing head amplifier $14_1$ to $14_9$ connected to the digital reproducing heads $3_1$ to $3_9$, respectively, of the fixed head unit 1, and nine switches $15_1$ to $15_9$ corrected to the reproducing head amplifiers $14_1$ to $14_9$. The switches $15_1$ to $15_8$ are constituted from on/off switches while the remaining switch $15_9$ which corresponds to the digital reproducing head $2_9$ for use for reproduction of a control code is constituted from a change-over switch. The switch $15_9$ has two terminals a and b and is changed over from the terminal a to the terminal b when the digital tape recorder of the fixed head type is in a control code reproducing mode in which a control code is reproduced.

The reproducing system further includes a control code decoding section 16 for decoding a control code read out from an analog record tape by the digital reproducing head $3_9$. The reproducing system further includes a digital signal reproducing processing section 17 for demodulating digital data of the 9-bit construction read out from the digital reproducing heads $3_1$ to $3_9$ into original digital signals of the left and right channels. The output digital signals of the digital signal reproducing processing section 17 are supplied to digital to analog (D/A) converters $18_L$ and $18_R$, by which they are converted into analog signals to be outputted as output signals of the left and right channels (Lch and Rch). The switches $15_1$ to $15_9$, digital signal reproducing processing section 17 and control code decoding system 16 are connected to be controlled by the controlling section 12.

The reproducing system described above operates in the following manner when, for example, a tune head ID code digitally recorded by the recording system of FIG. 2 described hereinabove is read by the reproducing system of FIG. 3.

Referring to FIG. 4, after processing is started, the controlling section 12 judges at step $S_1$ which one of recording and reproducing modes the current mode of the digital tape recorder is. In this instance, since a control code is to be reproduced, the control sequence advances to step $S_7$.

At step $S_7$, the controlling section 12 changes over the switches $15_1$ to $15_8$ other than the switch $15_9$ into an off state and changes over the remaining switch $15_9$ from the terminal a to the terminal b so that the digital reproducing head $3_9$ for reproduction of a control code is connected to the control code decoding section 16. Then at step $S_8$, the controlling section 12 puts the control code decoding section 16 into an operative condition.

When the reproduction of music on an analog track of a tape proceeds until it reaches the position of a tune for which a tune head ID code was recorded by the recording system of FIG. 2 described above, the digital reproducing head $3_9$ reads out the tune head ID code and sends it to the control code decoding section 16 by way of the switch $15_9$ at step $S_9$. The control code decoding section 16 decodes the thus transmitted tune head ID code and executes processing in accordance with the code at step $S_{10}$.

It is to be noted that, while the digital reproducing head $3_9$ at the innermost end is employed as a head for reproducing a control code, which one of the digital reproducing heads should be used naturally depends upon a relationship between a tape format of digital recording and another tape format of analog recording.

Having now fully described the invention, it will be apparent to one of ordinary skill in the art that many changes and modifications can be made thereto without departing from the spirit and scope of the invention as set forth herein.

What is claimed is:

1. A digital recording and reproducing method for a digital tape recorder of the fixed head type wherein a fixed head unit has a first track face on which an analog head is provided and a second track face on which a plurality of digital heads are provided, comprising the steps of:
   digitally recording, upon analog reproduction or recording from or onto one of a pair of analog tracks of a tape by means of said analog head, a desired control code onto a non-recorded gap portion of the other analog track using a particular one of said digital heads; and
   reading out, upon analog reproduction by said analog head, the digitally recorded control code from the tape using said digital heads.

2. A digital recording and reproducing method as claimed in claim 1, wherein said particular one of said digital heads is located at the innermost position in the arrangement of said digital heads.

3. A digital recording and reproducing method as claimed in claim 1, wherein said digital heads include a plurality of digital recording heads arranged in a column and a same plurality of digital reproducing heads arranged in another parallel column, and a particular one of said digital recording heads is used to digitally record a control code while one of said digital reproducing heads corresponding to the particular digital recording head is used to read out the control code.

4. A digital recording and reproducing system, comprising:
   a fixed head unit having a first track face on which an analog head is provided and a second track face on which a plurality of digital heads are provided;
   digital signal supplying means for supplying digital signals to be recorded by said digital heads;
   digital signal processing means for processing digital signals read by said digital heads;
   control code generating means for generating a control code;
   first change-over switch means interposed between a particular one of said digital heads and said digital signal supplying means;
   second change-over switch means interposed between the particular digital head and said digital signal processing means;
   control code decoding means for decoding a control code; and
   controlling means for controlling said first change-over switch means, upon analog reproduction or recording from or onto one of a pair of analog tracks of a tape by means of said analog head, to transmit a control code from said control code generating means to the particular digital head so as to be recorded onto a non-recorded gap portion of the other analog track and for controlling said second change-over switch means, upon analog reproduction by said analog head, to transmit a control code from the particular digital head to said control code decoding means.

5. A digital recording and reproducing system as claimed in claim 4, wherein said particular one of said digital heads is located at the innermost position in the arrangement of said digital heads.

6. A digital recording and reproducing system as claimed in claim 4, wherein said digital heads include a plurality of digital recording heads arranged in a column and a same plurality of digital reproducing heads arranged in another parallel column, and a particular one of said digital recording heads is used to digitally record a control code while one of said digital reproducing heads corresponding to the particular digital recording head is used to read out the control code.

7. A digital recording and reproducing system as claimed in claim 4, further comprising first on/off switch means interposed between said digital signal supplying means and said digital heads except the particular digital head, and second on/off switch means interposed between said digital signal processing means and said digital heads except the particular digital head, said first change-over and on/off switch means being controlled by said controlling means so as to allow, upon analog reproduction or recording by means of said analog head, digital signals to be transmitted from said digital signal supplying means to said digital heads, said second change-over and on/off switch means being controlled by said controlling means so as to allow, upon analog reproduction by said analog head, digital signals to be transmitted from said digital heads to said digital signal processing means.

8. A digital recording and reproducing system as claimed in claim 4, further comprising a switch unit including a plurality of switches for manually inputting information to be recorded as a digital code, said control code generating means generating a control code in response to information received from said switch unit.

9. A digital recording apparatus, comprising:
   a fixed head unit having a first track face on which an analog head is provided and a second track face on which a plurality of digital heads are provided;
   digital signal supplying means for supplying digital signals to be recorded by said digital heads;
   control code generating means for generating a control code;
   change-over switch means interposed between a particular one of said digital heads and said digital signal supplying means; and
   controlling means for controlling said change-over switch means, upon analog reproduction or recording from or onto one of a pair of analog tracks of a tape by means of said analog head, to transmit a control code from said control code generating means to the particular digital head so as to be recorded onto a non-recorded gap portion of the other analog track.

10. A digital reproducing apparatus, comprising:
    a fixed head unit having a first track face on which an analog head is provided and a second track face on which a plurality of digital heads are provided;
    digital signal processing means for processing digital signals read by said digital heads;
    change-over switch means interposed between a particular one of said digital heads and said digital signal processing means;
    control code decoding means for decoding a control code; and
    controlling means for controlling said change-over switch means, upon analog reproduction from one of a pair of analog tracks of a tape by means of said analog head, to transmit a control code read out by the particular digital head to said control code decoding means.

* * * * *